implement removably mounted on the slide.

5. A drafting instrument comprising a pointed post, a ribbed beam rigidly attached at right angles thereto, a slide resiliently clamping against said beam and having a portion interfitting and coacting with the ribbed portion of said beam to prevent lateral movement but permit lengthwise movement of the slide on the beam and a marking implement carried by said slide.

6. A drafting compass having in combination a pointed post having a body portion adapted to be grasped by the hand for rotating the same, a beam rigidly attached at right angles to said post, a U-shaped slide comprising two extended arms resiliently engaging opposite sides of said beam which permit free longitudinal movement of the slide, a marking instrument and means on the slide to hold said instrument adjustably thereon.

7. A drafting compass comprising a pointed post, a beam rigidly fastened at right angles thereto, an adjustable slide having pointed post, a beam rigidly fastened thereto, a slide adjustably mounted on the beam and having two slots therein and a drawing implement having projecting arms slidably and resiliently held in said slots.

12. A drafting instrument comprising a pointed post having a beam rigidly attached at right angles thereto, a V-shaped slide resiliently and movably engaging said beam, an extension arm adapted to be fastened to said beam by said slide, a second V-shaped slide adapted to be mounted on either the extension arm or the main beam, and a drawing point carried by said second slide.

13. A drafting compass, comprising a centering post, a beam attached to the post, a slide resiliently engaging the beam, an implement holding member attached to the slide which is fashioned to provide clamping members, a marking implement, and means applied to said clamping members to effect closure upon said implement.

14. In a drafting compass, a centering

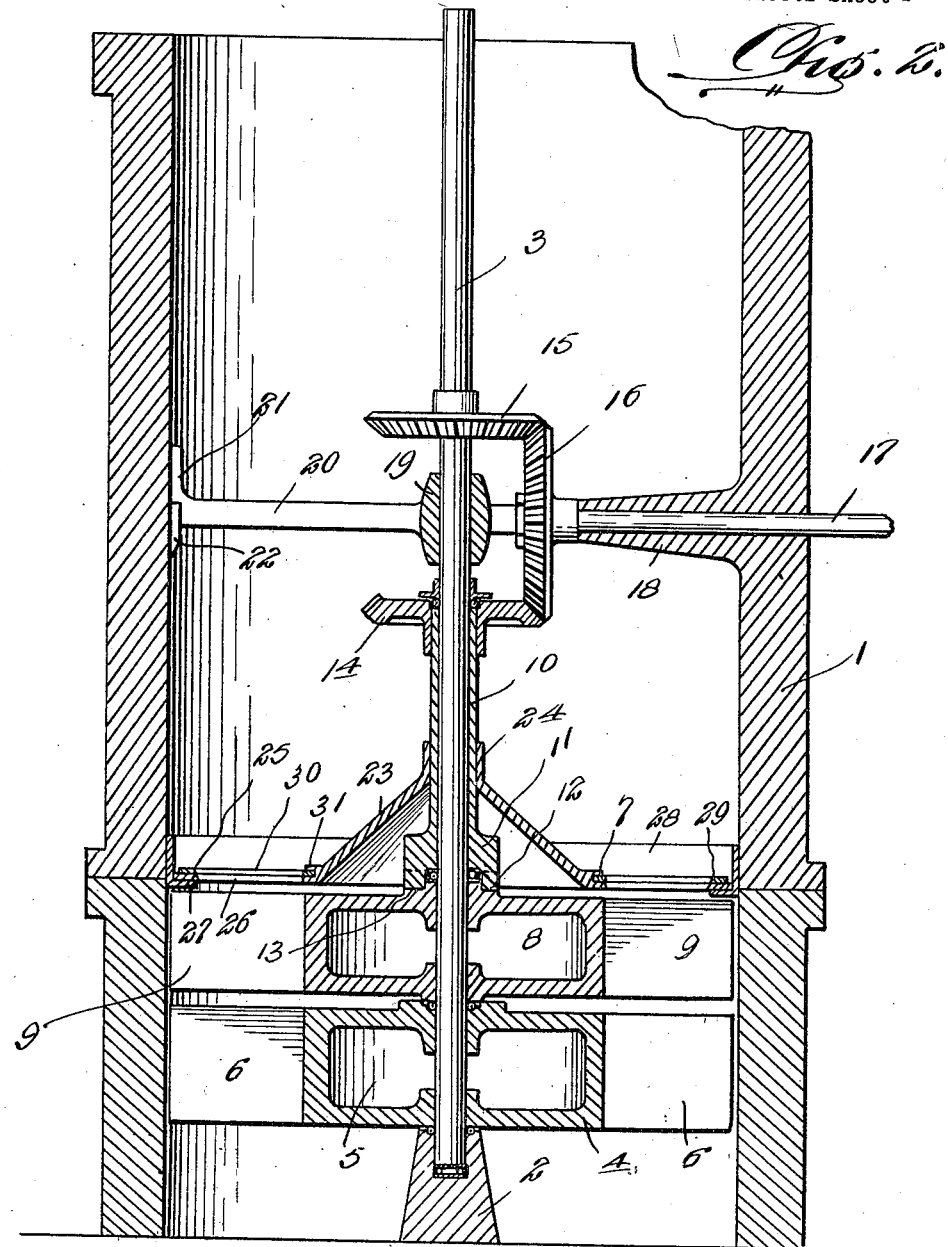

July 10, 1923.

T. J. JOLLY ET AL 1,461,422

WATER TURBINE

Filed May 2, 1922

Witness:-
N. Berman

Inventors
THOS. J. JOLLY
WM. FITZPATRICK
By Clarence A. O'Brien
Attorney

July 10, 1923. 1,461,422
T. J. JOLLY ET AL
WATER TURBINE
Filed May 2, 1922 5 Sheets-Sheet 4

Witness:
H. Burman

Inventors
THOS. J. JOLLY
WM. FITZPATRICK
By Clarence A. O'Brien
Attorney

Patented July 10, 1923.

1,461,422

UNITED STATES PATENT OFFICE.

THOMAS J. JOLLY AND WILLIAM F. FITZPATRICK, OF ULYSSES, NEBRASKA.

WATER TURBINE.

Application filed May 2, 1922. Serial No. 557,893.

*To all whom it may concern:*

Be it known that we, THOMAS J. JOLLY and WILLIAM F. FITZPATRICK, citizens of the United States, residing at Ulysses, in the county of Butler and State of Nebraska, have invented new and useful Improvements in Water Turbines, of which the following is a specification.

In carrying out the present invention it is our purpose to provide a water turbine wherein the flow of water to the wheels of the turbine may be controlled at will, so that the speed of the turbine wheels may be varied in accordance with the load thereon. It is also our purpose to provide a water turbine wherein a number of wheels arranged in a vertical series may be acted upon by the water successively and rotated in relatively opposite directions so as to obtain the maximum power from the water and wherein these oppositely rotating turbine wheels will be connected with the power shaft in such manner as to impart a continuous and uninterrupted uniform motion to the shaft.

A further object of our invention is to improve and simplify the general construction of water turbines and to provide a turbine wherein the component parts will be so arranged and corelated as to reduce the possibility of derangement to a minimum.

With the above recited objects in view, and others of a like nature, the invention resides in the construction, combination and arrangement of parts set forth in and falling within the scope of the appended claim.

In the accompanying drawings:

Figure 1 is a vetrical sectional view through a water turbine constructed in accordance with our invention parts being shown in elevation.

Figure 2 is a similar view showing parts in section that are illustrated in elevation in Figure 1.

Figure 3:
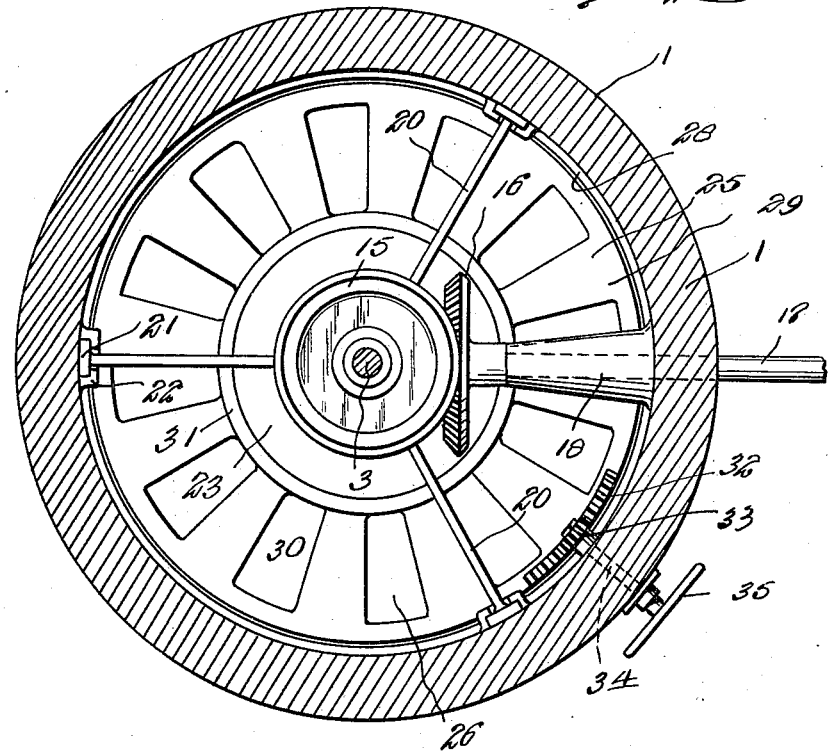
Figure 3 is a horizontal sectional view on the line 3—3 of Figure 1.
Figure 7:
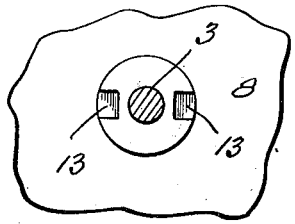
Figures 7 and 8 are enlarged fragmentary sectional views showing details of the invention.
Figure 4:
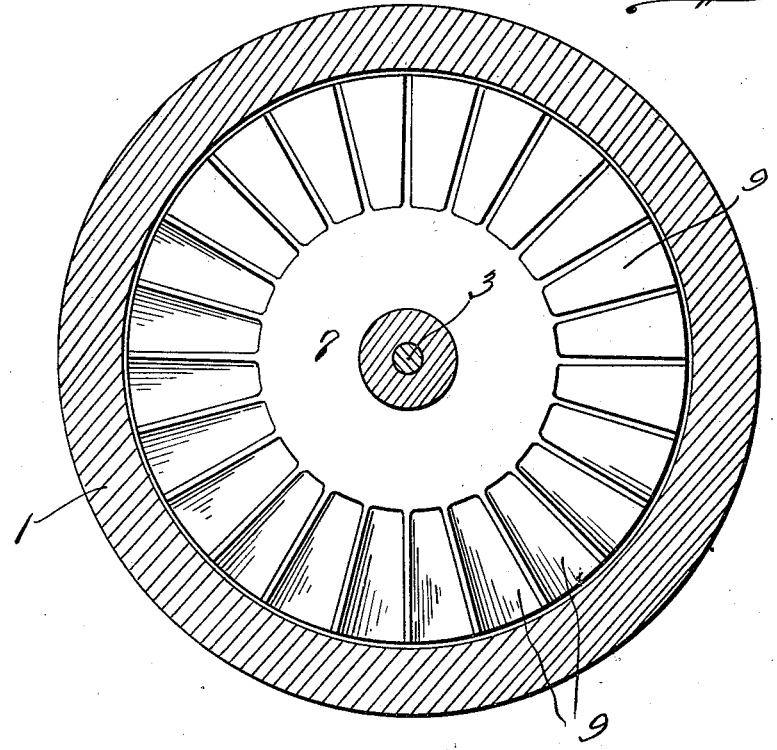
Figure 4 is a similar view on the line 4—4 of Figure 1.
Figure 8:
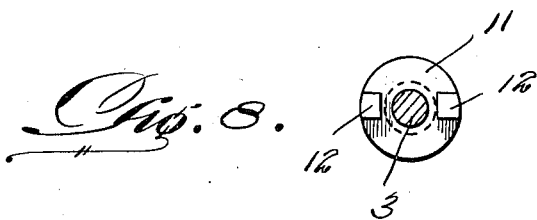
Figure 5:
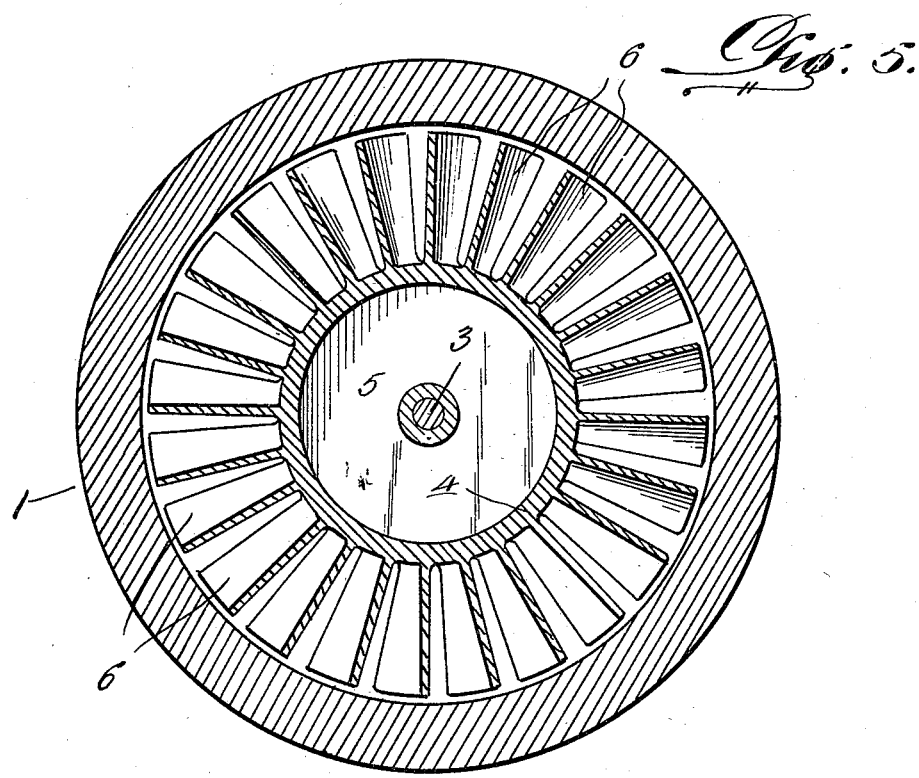
Figure 5 is a like view on the line 5—5 of Figure 1.

Referring now to the drawings in detail, 1 designates a vertical casing having the upper end formed to provide an inlet for the water and the lower end providing an outlet or discharge. Arranged within the casing 1 at the lower end thereof is a step bearing 2 and rotatably mounted in the step bearing 2 is the lower end of a vertical shaft 3 extending upwardly through the casing 1 at the center thereof. Fixed upon the vertical shaft 3 immediately above the step bearing 2 is a turbine wheel 4 comprising, in the present instance, a hollow hub-like portion 5 and blades 6 radiating from the hub and spaced apart equal distances around the hub. These blades 6 are arranged at an angle to the vertical so that as the water falls thereon the wheel 4 will be rotated in one direction. Loosely mounted upon the shaft 3 above the wheel 4 is a second water wheel 7 composed, in the present instance, of a hollow hub-like portion 8, and blades 9 radiating from the hub and disposed at an angle to the vertical and pitched in a direction opposite to the blades 6 of the wheel 4, so that the wheel 7 will be rotated in a direction opposite to the direction of rotation of the wheel 4. In the present instance the blades 9 are arranged closer together than the blades of the wheel 4, so that the water may act to its maximum capacity upon the wheels 7 and 4 in their vertical series, thereby enabling the wheels to be rotated about their axes with the effect to deliver the maximum power.

Loosely surrounding the shaft 3 above the wheel 7 is a sleeve 10 adapted for rotation around the shaft and connected to the hub portion of the wheel 7, so as to be revolved from such wheel. In the present instance, the lower end of the sleeve 10 is formed with an enlarged annular collar 11 and the lower end of the collar 11 is formed at diametrically opposite points with depending teeth 12 that engage in notches 13 formed in the upper surface of the hollow hub portion 8 of the water wheel 7. These interengaging teeth and notches form a connection between the water wheel 7 and the sleeve 10.

Keyed upon the upper end of the sleeve 10 is a beveled gear 14 and keyed upon the shaft 3 above the beveled gear 14 is a beveled gear 15. These beveled gears 14 and 15 mesh with a beveled gear 16 keyed upon one end of a horizontal power shaft 17 journaled in a bearing 18 carried by the inner wall of the casing 1, the shaft 17 extending outwardly from the casing so that the power may be taken therefrom in the operation of the water wheels.

Figure 6:
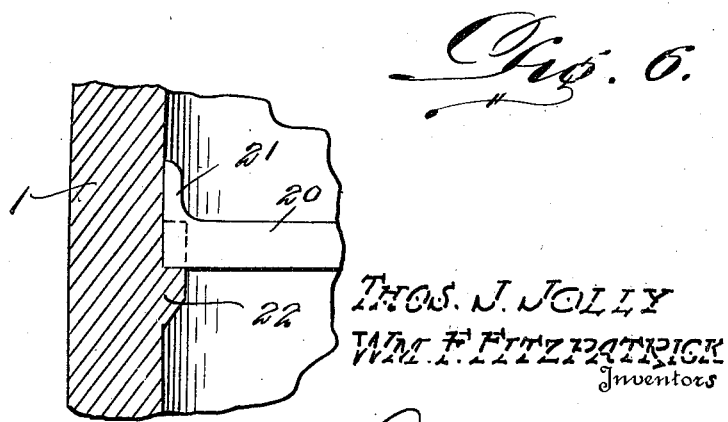
Figure 6 is an enlarged fragmentary sectional view showing a detail of the invention.

In the present instance, the shaft 3 is braced at a point between the beveled gears 14 and 15 by means of a bearing 19 that is carried by a spider 20 arranged within the casing 1. In this instance the outer ends of the arms of the spider 20 are formed with feet 21 engaged in recessed blocks 22 secured to the inner wall of the casing 1, as clearly illustrated in Figure 6 of the drawings.

In order to control the flow of water to the blades of the water wheels so that the speed of such wheels may be varied, we employ a valve mechanism which, in the embodiment of our invention selected for illustrative purposes comprises a cone-shaped housing 23 having the apex formed with an upstanding flange 24 encircling the sleeve 10 above the collar 11 and the lower edge formed with an outstanding horizontal plate 25 formed with radial slots 26 spaced apart equal distances and through which the water is adapted to flow to the blades of the wheel. The outer edge of the plate 25 rests upon a circular flange 27 carried by an annular band 28 engaged against the inner wall of the casing 1 and appropriately secured thereto. Mounted upon the plate 25 is an annular valve plate 29 formed with radial slots 30 spaced apart around the plate 29 and adapted to be moved into and out of registration respectively with the slots 26 in the plate 25. The inner edge of the plate 29 engaged in a groove 31 formed in the lower edge of the cone 23, so as to maintain the valve plate in proper position at all times. At a suitable point in its length the valve plate 29 is formed with a rack 32 engaged by a pinion 33 on one end of a shaft 34 journaled in the casing 1 and having its outer end equipped with a hand wheel 35. By means of the construction of valve mechanism just described it will be seen that when the hand wheel 35 is rotated motion will be imparted to the shaft 34, pinion 33 and rack 32 to the valve plate 29 whereby the latter may be adjusted to move the slots therein into and out of registration with the slots 26 in the plate 25 and to vary the size of the openings formed by the slots so that the flow of water to the water wheel may be permitted, cut off completely and regulated at will.

In practice, the head of water in the upper end of the casing 1 tends to flow from the valve mechanism and in the engagement with the blades of the water wheels 7 and 4, and when the valve mechanism is open the water acts upon the blades of the water wheels to turn the same in relatively reverse directions, thereby imparting motion to the shaft 3 and sleeve 10, and this motion is converted into a continuous rotary motion in one direction by means of the beveled gears 14, 15 and 16, so as to impart an uninterrupted motion to the shaft 17, from which power may be taken for any desired purpose.

By means of the valve mechanism hereinbefore described it will be seen that the flow of water to the wheels may be regulated and controlled.

If desired, suitable anti-friction bearings may be provided between the shaft 3 and the sleeve 10 and between the confronting surfaces of the hub surfaces of the hub portions of the water wheels 7 and 4, as clearly illustrated in Figure 2 of the drawings. This is so also in the step bearing.

While we have herein shown and described one preferred form of our invention by way of illustration, we wish it to be understood that we do not limit or confine ourselves to the precise details of construction herein shown and described, as modifications and variations may be made within the scope of the claim and without departing from the spirit of our invention.

Having thus described the invention, what is claimed as new is:—

In a water turbine, a vertical casing having the upper end formed to provide a water inlet and the lower end formed to provide a water outlet, a vertical shaft in said casing at the center thereof, a water wheel fixed upon said shaft adjacent to the lower extremity thereof and comprising a hub and blades radiating from the hub and pitched in a direction to rotate the wheel in one direction, a second water wheel loosely mounted upon said shaft above the first named water wheel and comprising a hub and blades radiating from the hub and pitched in a direction reverse to the direction of the blades of the first water wheel, whereby the second named water wheel may be rotated in a direction opposite to that of the first named water wheel, a sleeve loosely surrounding said shaft, a connection between the lower end of said sleeve and the second mentioned water wheel, a power shaft, driving connections between said power shaft and the first mentioned shaft and said sleeve, a valve mechanism for regulating and controlling the flow of water to said water wheels, said valve mechanism comprising a stationary plate formed with radial slots and a movable plate mounted upon said stationary plate and formed with radial slots adapted to be moved into and out of registration with the slots in said stationary plate including a rack on the upper surface of the latter and a horizontal operating shaft extending through the casing and having a pinion on its inner end meshing with said rack, mechanism for adjusting said movable plate, a flanged ring secured to the inner surface of said casing and acting to support the outer margin of said stationary plate, and a cone-shaped member integral with the central portion of said stationary plate and surrounding said first mentioned shaft and formed with a peripheral groove at the lower larger end thereof to receive the inner edge of said movable plate.

In testimony whereof we affix our signatures.

THOMAS J. JOLLY.
WILLIAM F. FITZPATRICK.